US008423042B2

(12) United States Patent
Markhovsky et al.

(10) Patent No.: US 8,423,042 B2
(45) Date of Patent: Apr. 16, 2013

(54) METHOD AND SYSTEM FOR POSITIONAL FINDING USING RF, CONTINUOUS AND/OR COMBINED MOVEMENT

(75) Inventors: Russ Markhovsky, Edgewater, MD (US); Evgenii Mikhienko, Novosibirsk (RU); Evgenii Vityaev, Novosibirsk (RU)

(73) Assignee: Invisitrack, Inc., Annapolis, MD (US)

( * ) Notice: Subject to any disclaimer, the term of this patent is extended or adjusted under 35 U.S.C. 154(b) by 1202 days.

(21) Appl. No.: 11/532,946

(22) Filed: Sep. 19, 2006

(65) Prior Publication Data

US 2007/0075898 A1 Apr. 5, 2007

Related U.S. Application Data

(63) Continuation-in-part of application No. 10/786,144, filed on Feb. 24, 2004.

(51) Int. Cl.
*H04W 24/00* (2009.01)
(52) U.S. Cl.
USPC .............. 455/456.1; 455/456.2; 455/456.5; 455/456.6; 455/456.3; 345/386
(58) Field of Classification Search ............... 455/456.1; 342/386
See application file for complete search history.

(56) References Cited

U.S. PATENT DOCUMENTS

| 6,038,491 | A | * | 3/2000 | McGarry et al. | 700/231 |
| 6,304,210 | B1 | * | 10/2001 | Allison et al. | 342/357.08 |
| 6,574,549 | B2 | * | 6/2003 | Cato et al. | 701/200 |
| 6,580,916 | B1 | * | 6/2003 | Weisshaar et al. | 455/456.1 |
| 6,970,703 | B2 | * | 11/2005 | Fuchs et al. | 455/426.1 |
| 2001/0053699 | A1 | * | 12/2001 | McCrady et al. | 455/513 |
| 2004/0061600 | A1 | * | 4/2004 | Wehner et al. | 340/435 |
| 2004/0192353 | A1 | * | 9/2004 | Mason et al. | 455/457 |

* cited by examiner

*Primary Examiner* — Kamran Afshar
*Assistant Examiner* — Shahriar Behnamian
(74) *Attorney, Agent, or Firm* — Woodcock Washburn LLP (57) ABSTRACT

A system for determining location of an object, the system including a Master Unit having an RF transceiver and adapted to measure distance to the Tag. The Master Unit has a first input from which it can derive its current position. The Master Unit transmits instructions to the Tag for movement in a predetermined direction. The Master Unit measures distance to the Tag after the movement in the predetermined direction. The Master Unit determines position of the Tag after the movement in the predetermined direction. The Tag can include a compass, a pedometer, and optionally an accelerometer, a solid-state gyroscope, an altimeter inputs for determining its current position by the Master Unit. The Master can optionally include a compass as well as a pedometer, an altimeter, an accelerometer, a solid-state gyroscope, an altimeter and a GPS receiver. Also, the Tag movement does not have to follow the Master's direction. However, the Master Unit still will be able to determine the Tag location(s). Also, the roles of the Master Unit and Tag can be reversed.

20 Claims, 7 Drawing Sheets

METHOD AND SYSTEM FOR POSITIONAL FINDING USING RF, CONTINUOUS AND/OR COMBINED MOVEMENT

CROSS-REFERENCE TO RELATED APPLICATIONS

This application is a continuation-in-part of U.S. patent application Ser. No. 10/786,144, filed on Feb. 24, 2004, entitled SYSTEM AND METHOD FOR FINDING, which is incorporated by reference herein in its entirety.

BACKGROUND OF THE INVENTION

1. Field of the Invention

The present invention relates generally to radio frequency (RF) track-locate systems and techniques and, more particularly, to a method and system of tracking, locating and determining the location of objects utilizing continuous combined movement.

2. Description of the Related Art

Most systems for locating use expensive infrastructure or global positioning system (GPS), to determine the position of the object. However, such locating systems are characterized by shortcomings associated with the power requirements and expensive infrastructure, and operating environment limitations in case of GPS. As a result, such conventional methods and systems are often not suitable for finding, tracking and locating people and objects in many types of environments.

Typical radio frequency (RF) systems have a fixed infrastructure and disadvantages for tracking continuous and/or combined movement of objects without the requirements of setting up fixed RF reference points, antenna size, range and RF wavelength. Systems having fixed signals require additional devices and installation costs; and these systems have disadvantages of signal interference and degradation that further limit their performance due to low power and compactness of RF systems used to search, locate and track objects. As a result, there is a need in the art for reducing fixed reference points, which also has advantages of enabling a system to locate objects utilizing the continuous and/or combined movement of both the objects and Master Units.

As a result, such conventional methods and conventional RF systems are not suitable for finding, tracking and locating objects in an environment with no fixed infrastructure, when only two devices (Master and target) are present in the environment, or when a signal, such as a GPS signal, is unable to be received, for example, inside a mall, urban canyons, etc. Note; The GPS receiver device needs to receive signals from at least three satellites or reference points (i.e., the GPS receiver has to be in line of sight of at least three satellites), in order to determine the location of the person or object being tracked. Each reference point is gathered by the GPS receiver and then needs to be processed by GPS receiver.

SUMMARY OF THE INVENTION

Accordingly, the present invention is related to providing location information without requiring any infrastructure or the reception of GPS signals, utilizing movements of RF Master Unit and an RF Tag that substantially obviates one or more of the disadvantages of the related art.

In one aspect, there is provided a system for measuring position of an object, the system including a Master Unit having an RF transceiver and adapted to interface to an RF Tag to measure distance to the RF Tag. The Master Unit has a first input from which it can derive its current position. The Master Unit transmits instructions to the Tag for movement in a predetermined direction. The Master Unit measures distance to the Tag after the movement in the predetermined direction. The Master Unit measures position of the Tag after the movement in the predetermined direction. The Master can include a compass input for determining current position of the Master Unit, for determination of its own current position and the position of the Tag. The first input can be a pedometer, accelerometer, a gyroscope, an altimeter or a GPS receiver. The RF Tag includes a first input a compass input and a compass input, which allows the Master Unit to determine the Tag position.

In another aspect, a system for measuring position of an object includes a Master Unit having an RF transceiver and adapted to interface to a Tag to measure a first distance to the Tag. The Master Unit has a first input from which it can derive its current position. The Master Unit has an interface to an operator for instructing the operator to move in a predetermined direction. The Master Unit measures a second distance to the Tag after the movement in some direction, e.g., some predetermined direction. The Master Unit measures position of the Tag after the movement in the predetermined direction, based on the first and second distance measurements.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The search methods described herein enable one Master Unit to determine the location of an object or person that has a Tag (e.g., an RFID Tag) located on the object or person. The system can locate the object that has a Tag thereon. Master Units can be used to track, locate, and monitor persons and objects equipped with a Tag and/or another Master Unit. The search methods enable a variety of compact and reliable RF-based location and tracking devices that can monitor and track the exact location of multiple objects. The system typically includes two primary components—a Master Unit and a Tag (sometimes also referred to as "Target").

A Tag includes an RF transmitter that, when activated by the Master Unit, broadcasts a unique, identifying RF signal. The Tag can be attached to or embedded in frequently lost objects, such keys, mobile phones, or laptop computers, as well as objects worn or carried by people, such as backpacks, jackets or specially designed bracelets. The Tag can also be used for tracking people and other objects, such as cars.

A Master Unit broadcasts an RF signal that activates the Tag(s). Upon receiving the unique identifying RF signal from the Tag(s), the Master Unit utilizes the search methods to determine the location of the object being tracked. The Master Unit then indicates the location of the Tag(s) relative to the Master Unit, including both distance and direction, via graphical and/or audio interfaces. A Master Unit can be a proprietary device or can be integrated into, e.g., a digital wristwatch, see FIG. 5, while Tag(s) can be housed in small items that can easily be affixed to frequently lost objects, as well as objects worn or carried by people. Both Tags and Master Units can be integrated into a wide variety of products, including cell phones, laptops, palmtops, GPS receivers, walkie-talkies, two-way pagers, handheld computers, keys, wallets, purses, golf balls, and automobiles. For use in tracking people, Tags can be embedded in clothing, backpacks, shoes and jewelry.

The Master Units and Tags can operate on any frequency, e.g., frequencies in the 100 Mhz, 200 Mhz, 400 Mhz, 900 Mhz, 2.4 Ghz ranges. All or some of the Master Units and Tags can be mobile. Each Master Unit and Tag has its own ID, and can include additional information, such as data about the person or item that is tagged. A Master Unit broadcasts RF signals, which are returned by the Tags. The Tags can be active tags (battery powered) or passive tags (powered by the Master Unit or some other source).

A search process, which can be implemented by either software or dedicated hardware, utilizes at least one Master Unit that can run the software. The software has the search methods that enable the Master Unit to find and locate other devices running the software. Master Units and Tags can also be equipped with, e.g., a compass, a pedometer, an accelerometer, a gyroscope, a solid-state gyroscope, a GPS and/or an altimeter as the source of their additional position input information. The control software can be used to find and locate other Master Units and/or Tags without the use of any other existing infrastructure. Methods are disclosed to use the device to search, find and locate the objects by using Master Units and Tags. A search process, which can be implemented in either hardware or software, utilizes one or more Master Units and Tag(s) that can run the software that utilizes a search method for continuous and/or combined movements of objects.

In the following description, there may be one or more Master Units and the Tags on the object being tracked, however, for simplicity, the discussion will utilize a single Master Unit and Tag.

The following is a general discussion of the problem that is being solved. In general, there are two scenarios:

1. Tracking (Search)—when the operator of the Master Unit initially does not know the location of a Tag (relative to the Master Unit) and needs to find the location of the Tag. Since no external references are available, under the guidance of the Master Unit, the operator of the Master Unit will move in a pattern (in response to the instructions from the Master Unit) and will locate the Tag that is being tracked. This method is called "Virtual Triangulation," And is described in U.S. patent application Ser. No. 10/786,144, filed on Feb. 24, 2004, entitled SYSTEM AND METHOD FOR FINDING, which is incorporated herein by reference in its entirety.

2. Locating—when operator of Master Unit needs to know the location of a non-moving Tag relative to the Master Unit. One way to accomplish this is for operator of the Master Unit to move in a predetermined pattern and use the Virtual Triangulation method to determine location(s) of the Tag(s) (in an essence, this process creates external reference points). This, however, may not always be practical because the operator would have to do this very often, or even continuously, if the Tag(s) are moving.

On the other hand, it is possible to use the natural (unsupervised) movement of the Tag(s) or for the Master Unit (automatically or using operator intervention) asking Tag to move. The Master Unit can remain stationary, which is the most common case, or the Master Unit is free to move in any fashion, i.e., not necessarily in the predetermined search pattern.

A common system coordinates should preferably be used by Master(s) and Target(s) (Tag(s)) (for example, compass-based North/South and East/West coordinate directions). Also, the Tags should be able to measure the distance traveled. This information is communicated to the Master Unit, and is called a "Reverse Virtual Triangulation" method.

Note that case of the first ("Tracking") scenario, there is no need for any system of coordinates and the Tag is not required to measure the distance it has traveled. In this scenario, only the Master Unit has to measure the distance traveled.

Modes of Operation

The three primary exemplary techniques to track and locate combined movements of the Tags are as follows:

(a) Continuous Distance Monitoring

In this mode, the Master Unit continuously monitors the distance to all objects being tracked in relation to the user. If any of the Tags move outside a user-defined range, the Master Unit's audio interface can notify the operator, e.g., via an alarm.

(b) Multiple Object Location

Figure 5:
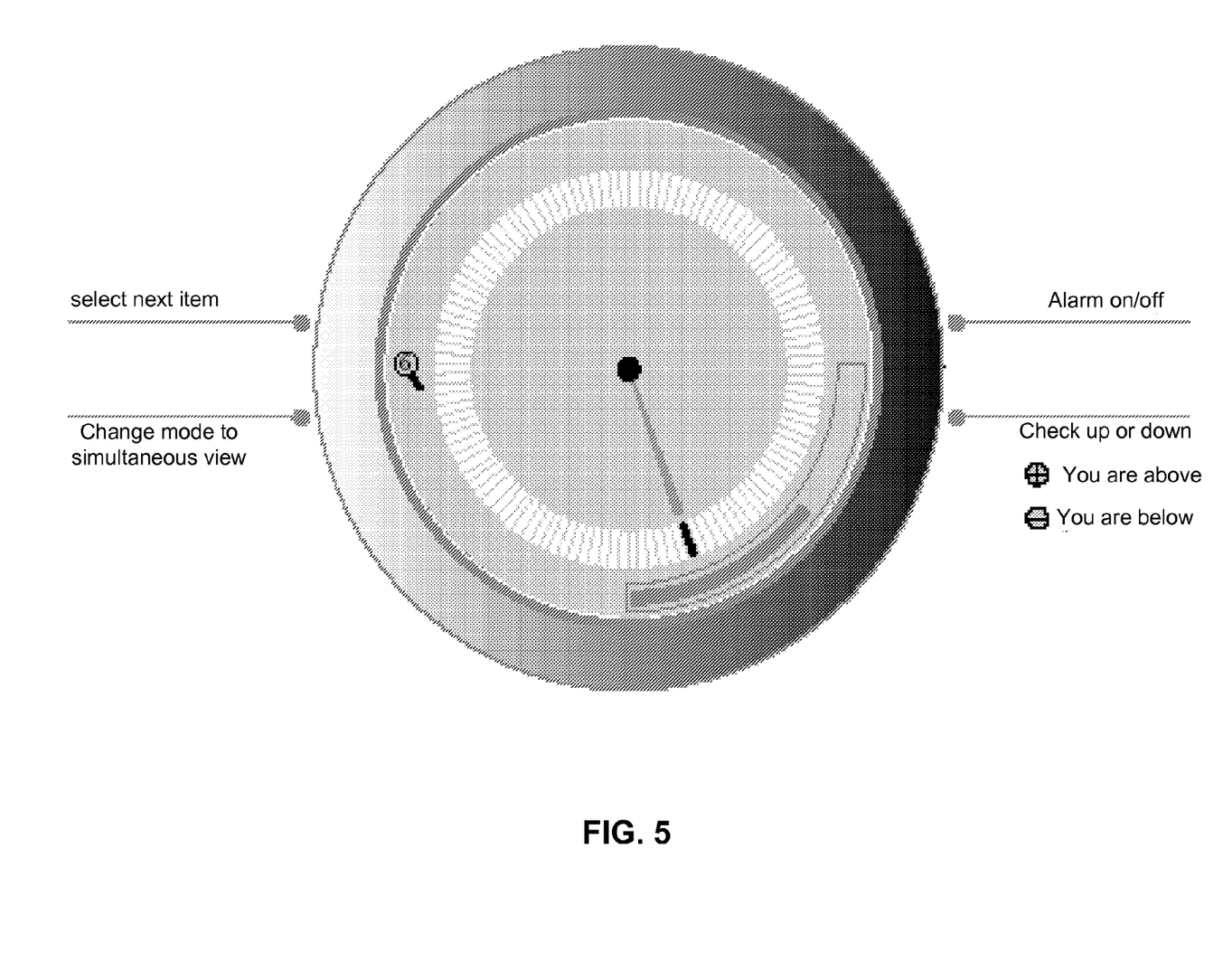
FIG. 5 illustrates an exemplary form factor for a Master Unit of the present invention.

This mode enables users to track the exact location of multiple Tags via a graphical interface that displays the direction and distance of the selected Tags in relation to the user. FIG. 5 illustrates an exemplary graphical interface located in the wristwatch watch-based Master Unit. The location of the operator is indicated by a black dot in the center of the display, and the locations of the various Tags are displayed in relation to the operator. The Master Units and Tags can be placed on a map if the Master Unit is GPS-enabled.

(c) Locating

When an operator wants to quickly locate a single Tag, he can quickly scroll through all the Tags being tracked and select the one he wants to locate. In the detailed search mode, the Master Unit graphically displays the distance and direction to the selected Tag. The Master Unit's optional audio interface can also provide the operator with audible directions to assist the operator in tracking the selected Target Unit.

Figure 3:
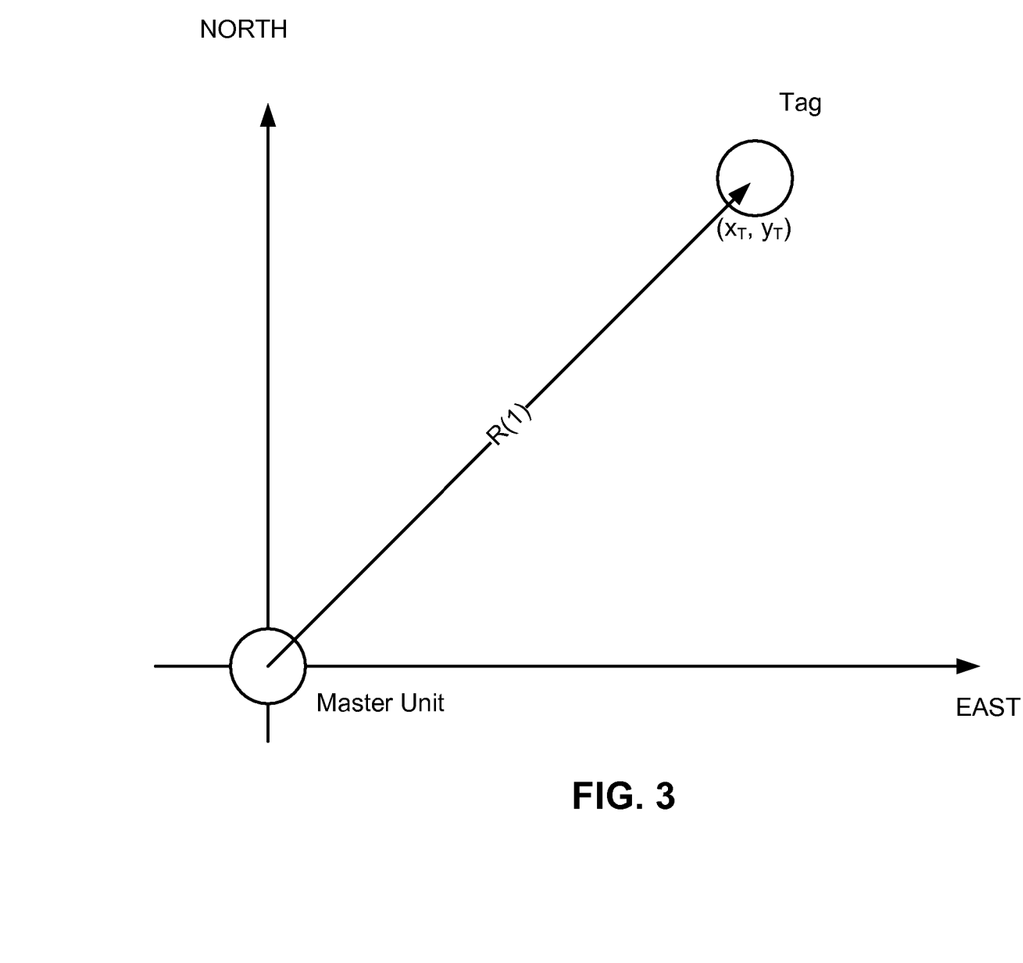
FIGS. 3 and 4 illustrate exemplary geometric aspects calculating Tag locations, according to one embodiment of the present invention.
Figure 4:
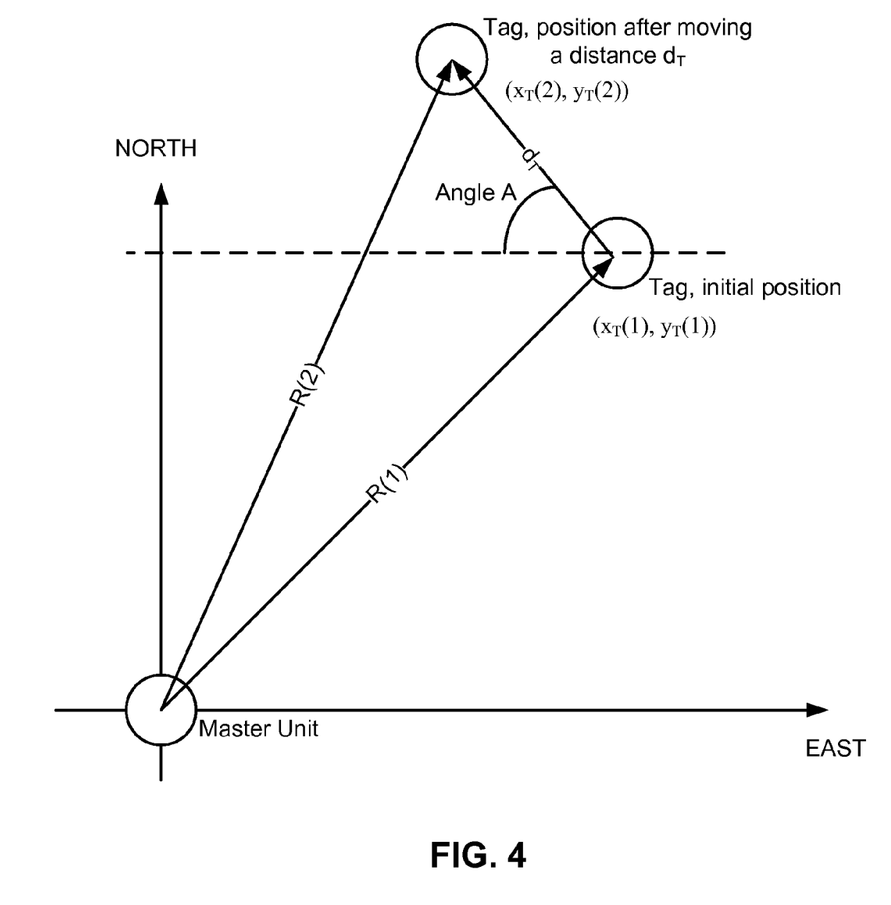

The operator and the Tag move according to the Master Unit operator's instructions. Assume that the following conditions are met:
1. A natural coordinate system related to the compass directions is defined;
2. The Tag and the operator have a compass, and they can measure the covered distance.
3. When the Tag and the operator move, the distance they cover is stored in memory, and so is the direction of the movement, expressed as the angle relative to one of the compass axes (for example, the "East" axis), see FIG. 3 and FIG. 4.

The following designations are used:
1. $(x_T, y_T)$—are the coordinates of the Tag
2. $(x_T(i), y_T(i))$—are the coordinates of the Tag after the i-th measurement, where $i >= 1$
3. $d_T(i)$—is the distance covered by the Tag after the i-1-th measurement, $i>1$, to simplify the equations, $d_T=d_T(1)$, also, $d_T=d_T(1)$ in FIG. 4.
4. $D_T(i)$—is the angle of the Tag movement after the i-th measurement
5. $R(i)$—is the distance from the Tag to the operator after the i-th measurement, $i>=1$
6. $(x_M(j), y_M(j))$—are the operator (Master Unit) coordinates after the j-th movement, where $j>=1$, we assume that before the start of movement (j=0), the operator is at the origin of the coordinates $x_M(0)=0$, $y_M(0)=0$. If Master Unit is stationary, then $x_M(j)=x_M(0)$ and $y_M(j)=y_M(0)$.
7. $d_M(j)$—is the distance covered by the operator with the Master Unit in the j-th time of movement $j>=1$. If the Master Unit is stationary, then $d_M(j)$ always equals zero.
8. $E(j)$—is the movement angle of the Master Unit in the time of the j-th movement $j>=1$.

Calculating Procedure 1

Figure 7:
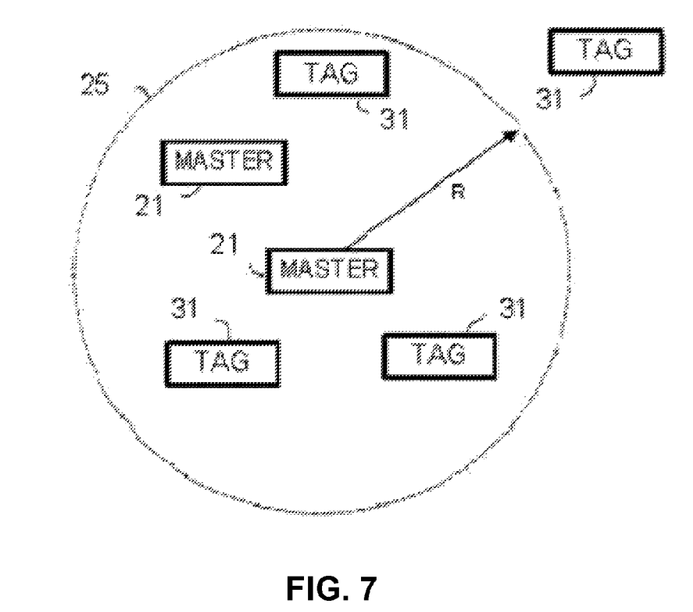
FIG. 7 illustrates an exemplary determination of the coordinates of a tag when the tag has exited a circle of a given radius around a master unit.

According to this method, the determination of the coordinates of the Tag location can be performed as follows:
(1) The angle A is the angle between the direction vector of the Tag movement and the "East" axis.
(2) A determination is made for the exit of the Tag from a circle of a given radius by the zero measurement, i.e., i=0, see 25 in FIG. 7
(3) If the target moves at an angle of either 90 degrees or 270 degrees (relative to the "East" axis), different equations need to be used for calculating the $(x_T(1), y_T(1))$ values.

For this reason, these three cases must be considered separately. According to the first case, if the operator of the Master Unit moves to the point with the coordinates $(x_M(1), y_M(1))$, in the process of the Tag's movement to some arbitrary coordinate $(x_T, y_T)$, the solution takes the form:
(I) When the angle A is neither 90° nor 270° (the Tag in the first move goes neither towards the north, nor towards the south)
The coordinate values are:

$$x_T^2 + y_T^2 = R(1)^2$$

$$(x_T - x_M(1) + d_T \cos A)^2 + (y_T - y_M(1) + d_T \sin A)^2 = R(1)^2$$

This set of equations has two solutions for the coordinates of the Tag $(x_T, y_T)$, designated $(x_T^{(1)}, y_T^{(1)})$ and $(x_T^{(2)}, y_T^{(2)})$:

$$x_T^{(1)} = (R(1)^2(x_M(1) - d_T\cos[A])^2 +$$
$$(x_M(1) - d_T\cos[A])^2(d_T^2 - R(2)^2 + x_M(1)^2 + y_M(1)^2 -$$
$$2d_T(x_M(1)\cos[A] + y_M(1)\sin[A])) + y_M(1)\sqrt{}$$

-continued
$$(-(x_M(1) - d_T\cos[A])^2(d_T^4 + ((R(1) - R(2))^2 - x_M(1)^2 -$$
$$y_M(1)^2)((R(1) + R(2))^2 - x_M(1)^2 - y_M(1)^2) -$$
$$2d_T^2(R(1)^2 + R(2)^2 - 2(x_M(1)^2 + y_M(1)^2)) +$$
$$2d_T(d_T(x_M(1) - y_M(1))(x_M(1) + y_M(1))\cos[2A] - 2$$
$$y_M(1)(d_T^2 - R(1)^2 - R(2)^2 + x_M(1)^2 + y_M(1)^2)$$
$$\sin[A] - 2x_M(1)\cos[A](d_T^2 - R(1)^2 - R(2)^2 +$$
$$x_M(1)^2 + y_M(1)^2 - 2d_T y_M(1)\sin[A])))-$$
$$d_T\sin[A]\sqrt{}(-(x_M(1) - d_T\cos[A])^2$$
$$(d_T^4 + ((R(1) - R(2))^2 - x_M(1)^2 - y_M(1)^2)$$
$$((R(1) + R(2))^2 - x_M(1)^2 - y_M(1)^2) -$$
$$2d_T^2(R(1)^2 + R(2)^2 - 2(x_M(1)^2 + y_M(1)^2)) +$$
$$2d_T(d_T(x_M(1) - y_M(1))(x_M(1) + y_M(1))\cos[2A] - 2$$
$$y_M(1)(d_T^2 - R(1)^2 - R(2)^2 + x_M(1)^2 + y_M(1)^2)$$
$$\sin[A] - 2x_M(1)\cos[A](d_T^2 - R(1)^2 - R(2)^2 +$$
$$x_M(1)^2 + y_M(1)^2 - 2d_T y_M(1)\sin[A]))))/$$
$$(2(x_M(1) - d_T\cos[A])(d_T^2 + x_M(1)^2 + y_M(1)^2 -$$
$$2d_T(x_M(1)\cos[A] + y_M(1)\sin[A])))$$

$$y_T^{(1)} = -(-y_M^{(1)}(2d_T^2 + R(1)^2 - R(2)^2 + x_M(1)^2 + y_M(1)^2) +$$
$$d_T y_M(1)(2x_M(1)\cos[A] + d_T\cos[2A]) + d_T(d_T^2 + R(1)^2 -$$
$$R(2)^2 + x_M(1)^2 + 3y_M(1)^2 - 2d_T x_M(1)\cos[A])\sin[A] +$$
$$\sqrt{}(-(x_M(1) - d_T\cos[A])^2(d_T^4 + ((R(1) - R(2))^2 - x_M(1)^2 -$$
$$y_M(1)^2)((R(1) + R(2))^2 - x_M(1)^2 - y_M(1)^2) -$$
$$2d_T^2(R(1)^2 + R(2)^2 - 2(x_M(1)^2 + y_M(1)^2)) +$$
$$2d_T(d_T(x_M(1) - y_M(1))(x_M(1) + y_M(1))\cos[2A] -$$
$$2y_M(1)(d_T^2 - R(1)^2 - R(2)^2 + x_M(1)^2 + y1^2)$$
$$\sin[A] - 2x_M(1)\cos[A]$$
$$(d_T^2 - R(1)^2 - R(2)^2 + x_M(1)^2 +$$
$$y_M(1)^2 - 2d_T y_M(1)\sin[A]))))/$$
$$(2(d_T^2 + x_M(1)^2 + y_M(1)^2 - 2d_T(x_M(1)\cos[A] + y_M(1)\sin[A])))$$

$$x_T^{(2)} = (R(1)^2(x_M(1) - d_T\cos[A])^2 + (x_M(1) - d_T\cos[A])^2(d_T^2 - R(2)^2 +$$
$$x_M(1)^2 + y_M(1)^2 - 2d_T(x_M(1)\cos[A] + y_M(1)\sin[A])) -$$
$$y_M(1)\sqrt{}(-(x_M(1) - d_T\cos[A])^2(d_T^4 + ((R(1) - R(2))^2 - x_M(1)^2 -$$
$$y_M(1)^2)((R(1) + R(2))^2 - x_M(1)^2 - y_M(1)^2) -$$
$$2d_T^2(R(1)^2 + R(2)^2 - 2(x_M(1)^2 + y_M(1)^2)) +$$
$$2d_T(d_T(x_M(1) - y_M(1))(x_M(1) + y_M(1))\cos[2A] -$$
$$2y_M(1)(d_T^2 - R(1)^2 - R(2)^2 + x_M(1)^2 + y_M(1)^2)$$
$$\sin[A] - 2x_M(1)\cos[A](d_T^2 - R(1)^2 - R(2)^2 +$$
$$x_M(1)^2 + y_M(1)^2 - 2d_T y_M(1)\sin[A]))) +$$
$$d_T\sin[A]\sqrt{}(-(x_M(1) - d_T\cos[A])^2$$
$$(d_T^4 + ((R(1) - R(2))^2 - x_M(1)^2 - y_M(1)^2)$$
$$((R(1) + R(2))^2 - x_M(1)^2 - y_M(1)^2) -$$
$$2d_T^2(R(1)^2 + R(2)^2 - 2(x_M(1)^2 + y_M(1)^2)) +$$
$$2d_T(d_T(x_M(1) - y_M(1))(x_M(1) + y_M(1))\cos[2A] -$$
$$2y_M(1)(d_T^2 - R(1)^2 - R(2)^2 + x_M(1)^2 + y_M(1)^2)$$

-continued
$$\text{Sin}[A] - 2x_M(1)\text{Cos}[A](d_T^2 - R(1)^2 - R(2)^2 +$$
$$x_M(1)^2 + y_M(1)^2 - 2d_T y_M(1)\text{Sin}[A]))) \Big/$$
$$(2(x_M(1) - d_T \text{Cos}[A])(d_T^2 + x_M(1)^2 + y_M(1)^2 -$$
$$2d_T(x_M(1)\text{Cos}[A] + y_M(1)\text{Sin}[A])))$$

$$y_T^{(2)} = \big(y_M^{(1)}(2d_T^2 + R(1)^2 - R(2)^2 + x_M(1)^2 + y_M(1)^2) -$$
$$d_T y_M(1)(2x_M(1)\text{Cos}[A] + d_T \text{Cos}[2A]) -$$
$$d_T(d_T^2 + R(1)^2 - R(2)^2 + x_M(1)^2 + 3y_M(1)^2 - 2d_T x_M(1)\text{Cos}[A])$$
$$\text{Sin}[A] +$$
$$\sqrt{(-(x_M(1) - d_T\text{Cos}[A])^2(d_T^4 + ((R(1) - R(2))^2 - x_M(1)^2 - y_M(1)^2)}$$
$$((R(1) + R(2))^2 - x_M(1)^2 - y_M(1)^2) -$$

$$x_T^{(1)} = \frac{1}{2x_M(1)(x_M(1)^2 + (d_T - y_M(1))^2)}\big(d^2 x_M(1)^2 +$$
$$d_T \sqrt{-x_M(1)^2(-(R(1)-R(2))^2 + x_M(1)^2 + (d_T - y_M(1))^2)(-(R(1)+R(2))^2 + x_M(1)^2 + (d_T - y_M(1))^2)} - 2d_T x_M(1)^2 y_M(1) -$$
$$\sqrt{-x_M(1)^2(-(R(1)-R(2))^2 + x_M(1)^2 + (d_T - y_M(1))^2)(-(R(1)+R(2))^2 + x_M(1)^2 + (d_T - y_M(1))^2)}\, y_M(1) +$$
$$x_M(1)^2(R(1)^2 - R(2)^2 + x_M(1)^2 + y_M(1)^2)\big)$$

$$y_T^{(1)} = \frac{\sqrt{-x_M(1)^2(-(R(1)-R(2))^2 + x_M(1)^2 + (d_T - y_M(1))^2)(-(R(1)+R(2))^2 + x_M(1)^2 + (d_T - y_M(1))^2)} - (R(1)^2 - R(2)^2 + x_M(1)^2 + (d_T - y_M(1))^2)(d_T - y_M(1))}{2(x_M(1)^2 + (d_T - y_M(1))^2)}$$

$$x_T^{(2)} = \frac{1}{2x_M(1)(x_M(1)^2 + (d_T - y_M(1))^2)}\big(d^2 x_M(1)^2 -$$
$$d_T \sqrt{-x_M(1)^2(-(R(1)-R(2))^2 + x_M(1)^2 + (d_T - y_M(1))^2)(-(R(1)+R(2))^2 + x_M(1)^2 + (d_T - y_M(1))^2)} - 2d_T x_M(1)^2 y_M(1) +$$
$$\sqrt{-x_M(1)^2(-(R(1)-R(2))^2 + x_M(1)^2 + (d_T - y_M(1))^2)(-(R(1)+R(2))^2 + x_M(1)^2 + (d_T - y_M(1))^2)}\, y_M(1) +$$
$$x_M(1)^2(R(1)^2 - R(2)^2 + x_M(1)^2 + y_M(1)^2)\big)$$

$$y_T^{(2)} = \frac{\sqrt{-x_M(1)^2(-(R(1)-R(2))^2 + x_M(1)^2 + (d_T - y_M(1))^2)(-(R(1)+R(2))^2 + x_M(1)^2 + (d_T - y_M(1))^2)} + (R(1)^2 - R(2)^2 + x_M(1)^2 + (d_T - y_M(1))^2)(d_T - y_M(1))}{2(x_M(1)^2 + (d_T - y_M(1))^2)}$$

-continued
$$2d_T^2(R(1)^2 + R(2)^2 - 2(x_M(1)^2 + y_M(1)^2)) +$$
$$2d_T(d_T(x_M(1) - y_M(1))(x_M(1) + y_M(1))\text{Cos}[2A] -$$
$$2y_M(1)(d_T^2 - R(1)^2 - R(2)^2 + x_M(1)^2 + y1^2)\text{Sin}[A] -$$
$$2x_M(1)\text{Cos}[A](d_T^2 - R(1)^2 - R(2)^2 + x_M(1)^2 +$$
$$y_M(1)^2 - 2d_T y_M(1)\text{Sin}[A])))\Big/$$
$$(2(d_T^2 + x_M(1)^2 + y_M(1)^2 - 2d_T(x_M(1)\text{Cos}[A] + y_M(1)\text{Sin}[A])))$$

Then the coordinates of the next point have two possible solutions:

$$(x_T^{(1)}, y_T^{(1)}) = (x_T^{(1)} + d_T * \cos A, y_T^{(1)} + d_T * \sin A)$$

$$(x_T^{(2)}, y_T^{(2)}) := (x_T^{(2)} + d_T * \cos A, y_T^{(2)} + d_T * \sin A)$$

(II) When the angle A is equal to 90°, the equations have the following form:

The coordinate values are:

$$x_T^2 + y_T^2 = R(1)^2$$

$$(x_T - x_M(1))^2 + (y_T - y_M(1) + d_T)^2 = R(2)^2$$

This system of equations also has two solutions for the Tag coordinates $(x_T^{(1)}, y_T^{(1)})$ and $(x_T^{(2)}, y_T^{(2)})$:

Then the coordinates of the next point have the following two possible solutions $(x_T^{(1)}, y_T^{(1)})$ and $(x_T^{(2)}, y_T^{(2)})$:

$$(x_T^{(1)}, y_T^{(1)}) = (x_T^{(1)}, y_T^{(1)} + d_T)$$

$$(x_T^{(2)}, y_T^{(2)}) = (x_T^{(2)}, y_T^{(2)} + d_T)$$

(III) When the angle A is equal to 270°, the equations have the form:
The coordinate values are:

$$x_T^2 + y_T^2 = R(1)^2$$

$$(x_T - x_M(1))^2 + (y_T - y_M(1) - d_T)^2 = R(2)^2$$

This system of equations also has two solutions for the Tag coordinates $(x_T^{(1)}, y_T^{(1)})$ and $(x_T^{(2)}, y_T^{(2)})$:

$$x_T^{(1)} = \frac{1}{2x_M(1)(x_M(1)^2 + (d_T + y_M(1))^2)}\big(d^2 x_M(1)^2 + 2d_T x_M(1)^2 y_M(1) + x_M(1)^2(R(1)^2 - R(2)^2 + x_M(1)^2 + y_M(1)^2) -$$
$$d_T \sqrt{-x_M(1)^2(-(R(1)-R(2))^2 + x_M(1)^2 + (d_T + y_M(1))^2)(-(R(1)+R(2))^2 + y_M(1)^2 + (d_T + y_M(1))^2)} -$$

-continued $$y_M(1)\sqrt{-x_M(1)^2(-(R(1)-R(2))^2+x_M(1)^2+(d_T+y_M(1))^2)(-(R(1)+R(2))^2+x_M(1)^2+(d_T+y_M(1))^2)}\Big),$$

$$y_T^{(1)} = \frac{(d_T+y_M(1))(R(1)^2-R(2)^2+x_M(1)^2+(d_T+y_M(1))^2)+}{\sqrt{-x_M(1)^2(-(R(1)-R(2))^2+x_M(1)^2+(d_T+y_M(1))^2)(-(R(1)+R(2))^2+x_M(1)^2+(d_T+y_M(1))^2)}}{2\left(x_M(1)^2+\left(d_T+y_M^{(1)}\right)^2\right)}$$

$$x_T^{(2)} = \frac{1}{2x_M(1)(x_M(1)^2+(d_T+y_M(1))^2)}\Big(d^2x_M(1)^2+2d_Tx_M(1)^2y_M(1)+x_M(1)^2(R(1)^2-R(2)^2+x_M(1)^2+y_M(1)^2)+$$

$$d_T\sqrt{-x_M(1)^2(-(R(1)-R(2))^2+x_M(1)^2+(d_T+y_M(1))^2)(-(R(1)+R(2))^2+y_M(1)^2+(d_T+y_M(1))^2)}\ +$$

$$y_M(1)\sqrt{-x_M(1)^2(-(R(1)-R(2))^2+x_M(1)^2+(d_T+y_M(1))^2)(-(R(1)+R(2))^2+x_M(1)^2+(d_T+y_M(1))^2)}\Big),$$

$$y_T^{(2)} = \frac{(d_T+y_M(1))(R(1)^2-R(2)^2+x_M(1)^2+(d_T+y_M(1))^2)-}{\sqrt{-x_M(1)^2(-(R(1)-R(2))^2+x_M(1)^2+(d_T+y_M(1))^2)(-(R(1)-R(2))^2+x_M(1)^2+(d_T+y_M(1))^2)}}{2\left(x_M(1)^2+\left(d_T+y_M^{(1)}\right)^2\right)}$$

Then the coordinates of the next point have the following two possibilities $(x_T^{(1)}, y_T^{(1)})$ and $(x_T^{(2)}, y_T^{(2)})$:

$(x_T^{(1)}, y_T^{(1)}) = (x_T^{(1)}, y_T^{(1)} - d_T)$ $(x_T^{(2)}, y_T^{(2)}) = (x_T^{(2)}, y_T^{(2)} - d_T)$

In each of the cases (I), (II) and (III), both solutions are stored in the memory of the Master Unit. The choice of one of the solutions is made in the processes of further movements of the Tag.

Calculating Procedure 2—Calculation of the C(i) angle.

The C(i) angle refers to the preferred direction of the Tag movement, which is calculated by the Master Unit. The Master Unit requests that the Tag move in this direction. However, the Tag is free to choose another direction, see discussion below, including, but not necessarily, the direction that the Master Unit prefers (which may be for ease of calculations, and to avoid uncertainty). It is assumed that during the time of the Tag movement, the operator moves to the point $(x_M(1), y_M(1))$. The angle B(i) is the angle between the vector of the operator movement direction and the straight line perpendicular to the "North", passing through the point at which the target is located at the i-th measurement.

Figure 6:
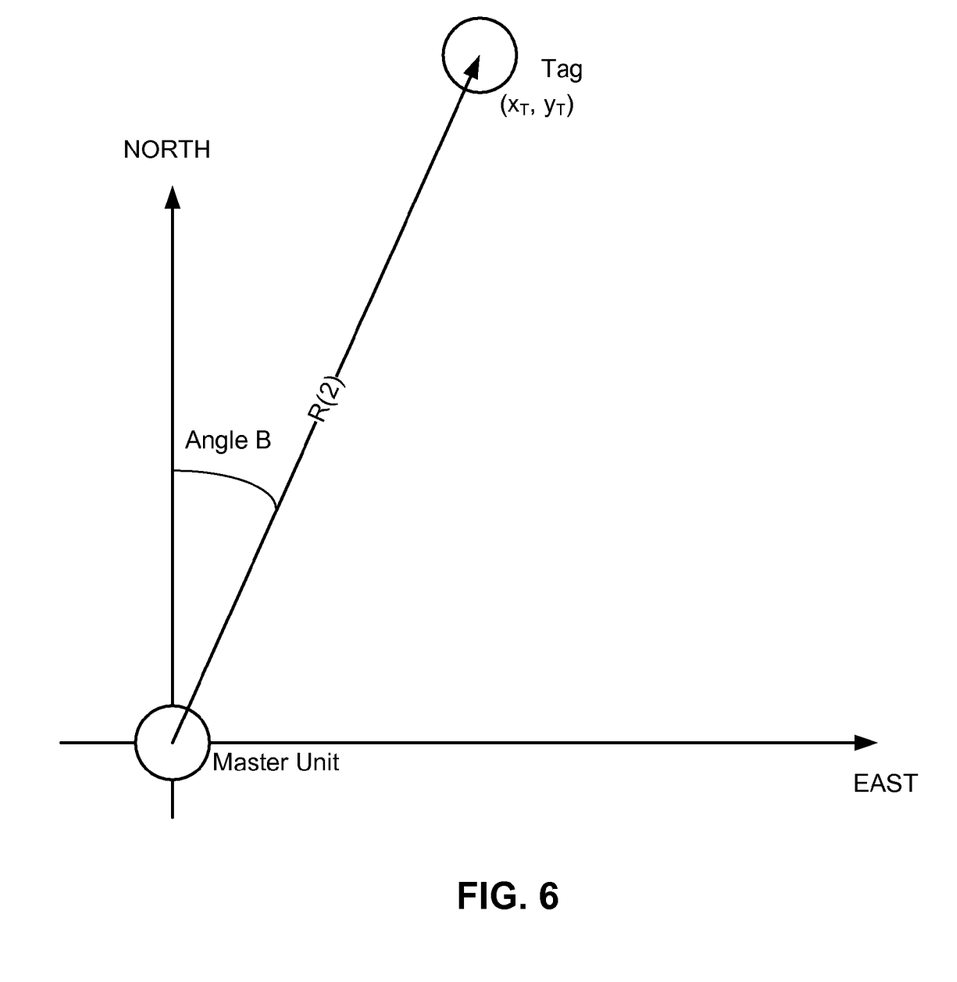
FIG. 6 illustrates an exemplary "homecoming" scenario using Master Unit(s) and Tags.

Referring to FIG. 6, and knowing the coordinates of the Tag in a "natural" coordinate system, the Master Unit can easily determine the direction to the Tag and angle corresponding to the movement of the Tag. The angle B is given by $$B = \arccos\left(\frac{x_M(1)}{R(2)}\right),$$

the direction to the Tag is southwest, since $x_M(1)>0$ and $y_M(1)>0$. The Tag, following the operator's instructions, moves and reaches the operator, with the Master Unit. Knowing the distance covered by the Tag and the direction of movement of the Tag, it is possible to determine its position at any point in time.

The coordinate values are:

$$\text{angle } B(i) = \arccos\left(\frac{x_T(i) - x_M(1)}{R(2)}\right)$$

if $x_T(i)>0, y_T(i)>0, C(i)=180°+B(i)$ relative to the "Last" axis if $x_T(i)>0, y_T(i)<0, C(i)=180°-B(i)$ relative to the "East" axis if $x_T(i)<0, y_T(i)>0, C(i)=360°-B(i)$ relative to the "East" axis if $x_T(i)<0, y_T(i)<0, C(i)=B(i)$ relative to the "East" axis, where i>=1

Calculating Procedure 3

This procedure calculates the coordinates $(x_T(i), y_T(i))$ after the Tag moves at an angle $D_T(i-1)$ relative to the "East" axis. If the Tag moved in the direction that was requested, then $D_T(i)=C(i)$. It is assumed that the operator of the Master Unit, during the Tag movement, relocated to the point $(x_M(1), y_M(1))$. The new coordinates of the Tag and the expected new distance from the Tag to the operator are:

$$x_T(i) = x_T(i-1) + D_T(i) * \cos(D_T(i-1))$$

$$y_T(i) = y_T(i-1) + D_T(i) * \sin(D_T(i-1))$$

$$R(i+1) = \sqrt{(x_T(i) - x_M^{(1)})^2 + (y_T(i) - y_M^{(1)})^2}$$

Calculating Procedure 4

This procedure calculates the operator coordinates after movement at the angle E(j−1) relative to the "East" axis. Using this procedure, the Master Unit operator knows his own coordinates at any moment $$x_M(j) = x_M(j-1) + d_M(j) * \cos(E(j-1))$$

$$y_M(j) = y_M(j-1) + d_M(j) * \sin(E(j-1))$$

The process of this "combined movement" of the Master Unit and the Tag together, can be detailed as follows:

1. The locating process is started;
2. The operator's Master Unit measures the distance to the target R(1);
3. The Tag moves in a direction $D_T(i)$, and, knowing $D_T(i)$, the angle A can be determined. The Master Unit operator moves in different directions during the Tag movement, noting the movement direction and the covered distance. The Master Unit calculates new coordinates $(x_M(1), y_M(1))$ according to Calculating Procedure 4 and knows them at any given time;

4. The Tag transmits, to the Master Unit, the angle A of the Tag's movement direction and also the Tag's covered distance $d_T(i)$;

5. The Master Unit measures the distance R(2) to the Tag while the Master Unit is located at the coordinates $(x_M(1), y_M(1))$;

6. Based on the R(i), R(i+1), the $D_T(i)$ angle of the movement direction of the Tag, the $d_T(i)$ distance and the new Master Unit coordinates $(x_M(1), y_M(1))$, corresponding to a point of movement of the Master Unit to $(x(j+1), y(j+1))$, the Master Unit:
   a. using Calculating Procedure 1, calculates the Tag's $(x_T(i), y_T(i))$ coordinates and the Tag's current coordinates $(x_T(i+1), y_T(i+1))$ for both possible solutions.
   b. using Calculating Procedure 2, calculates the C(i+1) angle and the movement direction towards the Master Unit, also for both possible solutions.
   c. sends a movement request (preferred direction of movement C(i+1)) to the Tag to move in another direction that is along the same line as the previous direction.

7. The Tag transmits to the Master Unit the $D_T(i+1)$ angle of the Tag's movement direction and also Tag's the covered distance d(i+1).

8. Irrespective of whether or not the Tag moved in the requested direction C(i+1) (with $D_T(i+1)=C(i+1)$, or $D_T(i+1) \neq C(i+1)$), and using the direction D(i+1) of the Tag's movement and the covered distance $d_T(i+1)$, the Master Unit calculates the new coordinates $(x_T(i+2), y_T(i+2))$ and the expected distance R(i+2) to the Tag using Calculating Procedure 3 for both solutions for the coordinates $(x_T(i), y_T(i))$, $(x_T(i+1), y_T(i+1))$, taking into account that the operator himself (in the process of Tag's movement) moved to a new point $(x_M(1), y_M(1))$, corresponding to the next point of movement $(x_M(j+2), y_M(j+2))$.

9. The Master Unit measures the distance R(i+2) to the Tag, compares it with the two calculated for the different two solutions and finds the solution for the distance $(x_T(i+2), y_T(i+2))$ to which the measured distance corresponds (with the required accuracy). The Master Unit stores this solution in its memory. If both solutions fit the distance R(i+2) with the required accuracy, which is possible if the Tag moves along the same direction despite the movement request from Master Unit (C(i+1)), the Master Unit transfers the beginning of the coordinates to the point $(x(j+1), y(j+1))$, stores in memory the distance R(i+2) as R(2), R(i+1) as R(1), and proceeds to step 6.

10. Based on the single found solution $(x_T(i+2), y_T(i+2))$ according to the Calculating Procedure 2, the angle B and the movement direction of the Tag relative to the operator are calculated by Master Unit. The Master Unit sends movement requests to the Tag to move in the calculated preferred direction.

11. The Tag transmits the movement angle $D_T(i)$ and the covered distance $d_T(i)$ to the Master Unit.

12. The Master Unit then:
   a. calculates the new target coordinates $(x_T(i), y_T(i))$ according to Calculating Procedure 3;
   b. calculates the new coordinates $(x_M(1), y_M(1))$ according to Calculating Procedure 4;
   c. calculates the preferred movement direction of the Tag relative to the Master Unit according to Calculating Procedure 2 and transmits it to the Tag.

13. Steps 10-11 are repeated until the Tag reaches the Master Unit.

The algorithm described above requires of the Tag to interface to a compass and a pedometer or some other similar device. Use of a pedometer is, in principle, not required, if an indicator of the average Tag speed is introduced, and accordingly, a watch can be used to measure the covered distance. However, the accuracy of the algorithm, when using the average speed parameter, will usually be lower than when using the pedometer.

If it is preferred not to use a compass, in principle, the Virtual Triangulation algorithm can be utilized, the difference being that the roles of the Tag and the Master Unit are interchanged (i.e., reversed, hence the term "Reverse Virtual Triangulation"). In addition, the condition is introduced that the operator (Master Unit) (i.e., the Tag in the previous algorithms) stands still, and the Tag approaches the Master Unit while gradually moving at the calculated angles.

Figure 1:
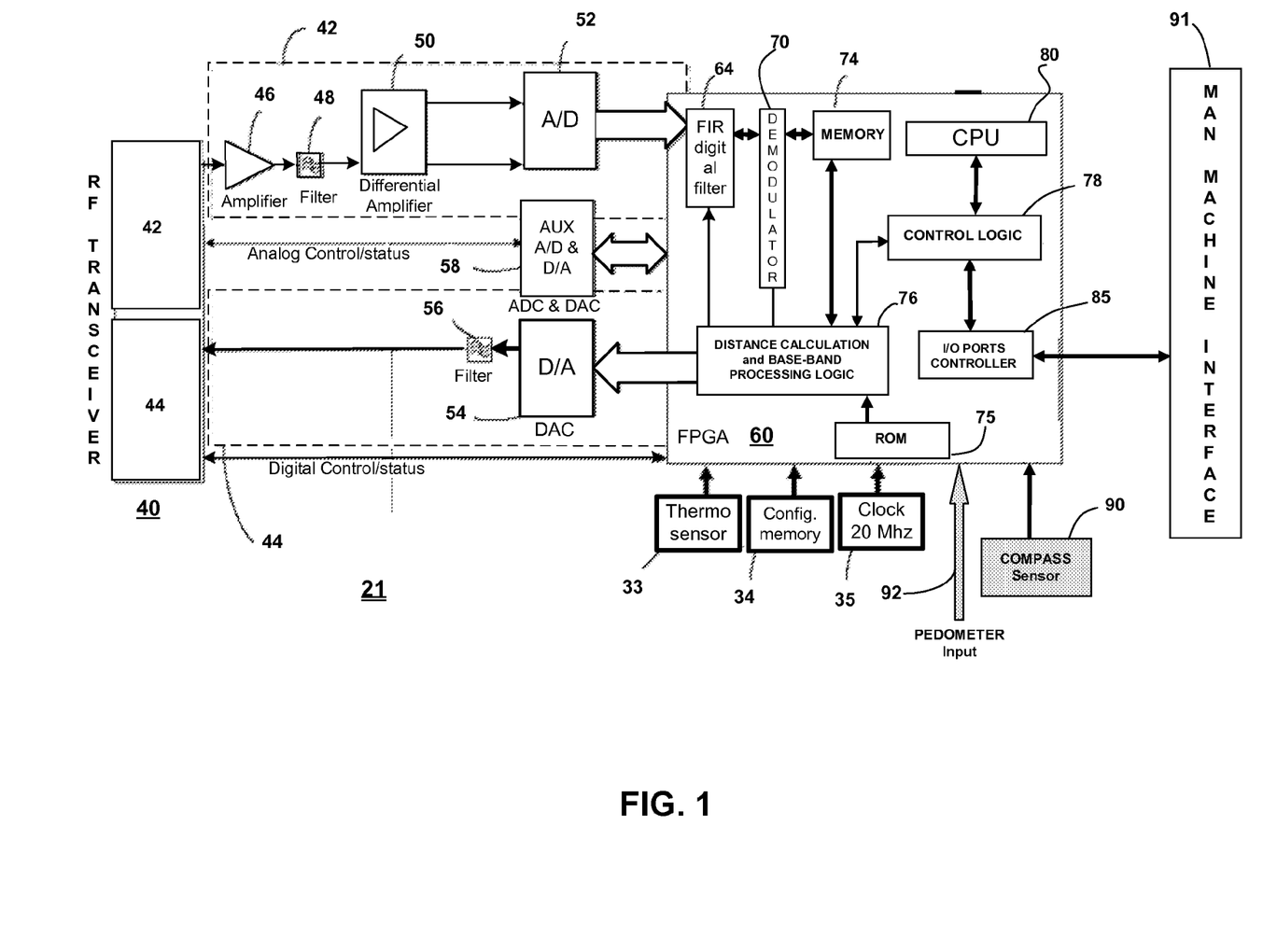
FIG. 1 illustrates an exemplary Master Unit of the present invention.
Figure 2:
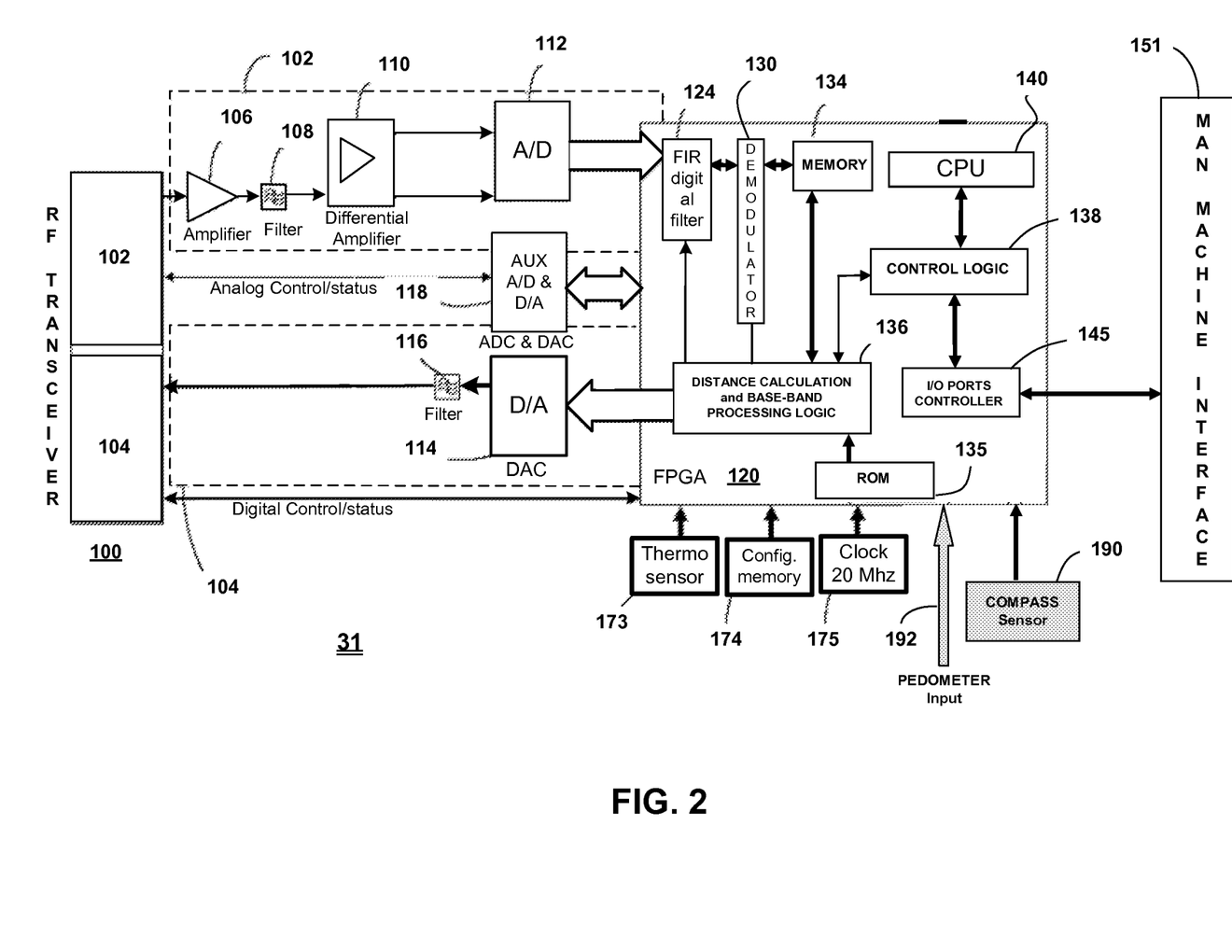
FIG. 2 illustrates an exemplary Tag of the present invention.

FIGS. 1 and 2 illustrate exemplary Master Units and Tags that may be used in the present invention. Referring to FIG. 1, a block-diagram describes the exemplary Master Unit 21. The Master Unit 21 is configured with an RF Transceiver 40 for generating an RF ranging signal or an RF voice/data communication signal, and for processing a received RF signal, such as a voice/data communication reply or a ranging signal, as appropriate. The received signal can be a reply signal from a Tag. Alternatively, the received signal can be a reply signal or a ranging signal from another Master Unit. Note that the Master Unit—Tag RF link is capable of carrying voice and/or telemetry information, for example, temperature readings.

The RF Transceiver 40 generally includes a receiver down-converter section 42 and a transmitter up-converter section 44. The down-converter section 42 of the RF transceiver 40 receives a ranging or reply signal. The received signal is processed (down-converted) by the receiver section 42, and the down converted signal is supplied to an amplifier 46 to amplify the down converted signal, a band pass filter 48 for further filtering of the down converted received signal, a differential amplifier 50 to further condition the received signal, and a Analog-to-Digital Converter (ADC) 52 to convert the received signal (a reply or ranging signal from a Tag, or, alternatively, the reply or ranging signal from another Master Unit) into a digital representation, for example, a 12-bit signal representation, so it can be processed using Digital Signal Processing (DSP) and/or Software Digital (Defined) Radio (SDR) techniques.

The ADC converter 52 output is the down-converted RF signal in the digital format that is supplied to the FPGA 60. The signal is processed by passing through the FIR filters 64 before entering the digital demodulator block 70. The digital demodulator 70 converts the filtered down converted signal from FIR filters 64 into base-band ranging signal or voice/data communication base-band signal, also in sampled digital format. The digital demodulator 70 also filters these base-band signals. When receiving a ranging signal, the ranging signal is filtered to a base-band signal that is sent to the base-band ranging signal processor/detector and distance calculator 76. Other elements of the Master Unit are: a memory 74, such as a memory buffer or FIFO buffer, a read-only memory (ROM) 75, a control logic 78, a CPU 80 and an I/O Ports Controller 85. All other signals are sent to the I/O Controller 85 in digital format for transferring to the man-machine interface/external host 91, and for internal processing by the CPU 80 that is also connected to the I/O Controller 85. The host can be a computer, for example laptop, PDA, etc., which can be used to perform man-machine interface functions. Also, traditional devices such as displays, speaker, keys, etc., can be used for this purpose. The FIR filter 64, the Digital demodulator 70, the CPU 80 and the base-band ranging signal processor, which includes blocks 74, 75, 76 and 78 can also be implemented in the FPGA 60.

Similarly, the transmitter up-converter section 44 up-converts and transmits a base-band ranging signal and/or the base-band voice/data communication signal. The base-band ranging signal values can be stored in a non-volatile memory of the FPGA 60 such as, for example, the base-band ranging signal is stored in the ranging signal processor's ROM 75. The base-band ranging signal can be generated in a digital format by the base-band ranging signal processor 76 implemented in the FPGA 60 logic. The base-band ranging signal is passed to the up-converter 44 through the Digital-to-Analog Converter (DAC) 54 and the band-pass filter 56. The output of the band-pass filter 56 is connected to the up-converter 44 transmitter of the RF transceiver's 40. In operation, the up converter 44 transmitter of the RF transceiver 40 includes the RF modulator.

Referring to FIG. 1, in the FPGA 60, the base-band ranging signal processor 76 operates to assemble all of the values for the base-band ranging signal. The RAM memory 74 operates as a memory buffer, FIFO buffer or otherwise for operations purposes, for example, to store values from distance calculations. The distance calculator 76 generates values for the distance calculation based on the techniques described above. The I/O Ports controller 85 operatively controls data, status and requests in the CPU 80 and the ports, such as receiving and providing information from/to the man machine interface 91. General-purpose ports, as well as RS232 interface, can be used to interface to other computers, displays, speakers and or microphones to provide an effective man machine interface 91. Element 58 in FIG. 1 is a combination of low-speed ADC and DAC plus other circuitry that allows for FPGA 60 to control/tune the RF Transceiver 40 as well as to obtain status information from the RF Transceiver 40.

Element 33 is a thermal sensor that measures the temperature of critical component(s) in the RF transceiver 40. Its purpose is to offset changes in the signal propagation in the RF transceiver 40 circuitries. Element 34 is flash memory that permanently stores the FPGA 60 configuration. The FPGA cannot retain its configuration after power is OFF. This is done in the element 34. After power-up the content of the element 34 flash is uploaded into FPGA 60. Element 35 is the system clock, for example, 20 MHz.

Also shown in FIG. 1 is a compass sensor 90, and a pedometer input 92. as discussed earlier, these elements are intended to provide an independent source of positional information to the Master Unit 21. Specifically, the pedometer input provides a signal from a pedometer, that tells the Master Unit 21 how far the operator has walked, after being instructed to do so. The compass sensor 90 provides an input to the Master Unit 21 that tells the Master Unit 21 the direction in which the operator of the Master Unit is walking. As discussed earlier, other sensors can be used to inform the master Unit of the direction and distance of movement of the Master Unit 21—for example, a GPS receiver's output, and altimeter's output, or any other mechanism, for example, an accelerometer, a gyroscope, and/or a solid-state gyroscope, that provides either the current position and direction relative to a previous position, or the direction of movement and the distance traveled, or, even, an accelerometer or a accelerometer type device, from which similar information can be derived.

Referring to FIG. 2, a block-diagram describes the Tag 31 according to one embodiment of the present invention. Alternatively, FIG. 2 illustrates a block-diagram of the Master Unit 21 that is acting as a Tag according to the present invention. The RF transceiver (up/down converter) 100 operation is identical to the Master Unit's RF transceiver (up/down converter) 40 in FIG. 1. The RF transceiver 100 receives signals and supplies them to the received signal-processing block 102. The received signal is processed (down-converted) by the received signal processing portion 102 and supplied to an amplifier 106 to amplify the received signal, a filter 108 to further filter the received signal, a differential amplifier 110 to further condition the received down converted signal, and Analog-to-Digital Converter (ADC) 112 to convert the received signal (a ranging signal, command, reply signal, etc. from the Master Unit 21) into a digital representation for example, a 12-bit signal representation, so it can be processed using DSP and/or SDR techniques. The ADC converter 112 output is sent to the FPGA 120. The down-converted received RF signal in the digital format that is passed through the FIR filters 124 before entering the digital demodulator block 130.

The digital demodulator 130 converts the filtered down-converted signal from the FIR filter 124 into base-band ranging signal or voice/data communication base-band signal also in digital format (samples). The digital demodulator 130 also filters these base-band signals. For the ranging signal this filtered base-band signal is sent to the base-band ranging signal processor/detector, which includes functions or components shown in blocks for a memory 134, such as RAM, FIFO buffer or other memory, read-only memory ROM 135 and control logic 138. All other signals are sent to the I/O Controller 145 in the digital format for transferring to man-machine interface/external Host 151 and/or for internal processing by the CPU 140 that is also connected to the I/O Ports Controller 145. The FIR filters 124, the digital demodulator 130, the CPU 140 and the base-band ranging signal processor/detector and distance calculator 136, RAM 134, ROM 135 and control logic 138 can all be implemented in FPGA 120.

During the processing, the received base-band ranging signal in digital format is stored in memory 134. After processing in the FPGA 120, the received base-band ranging signal is sent to the up converter 104 through the Digital-to-Analog Converter (DAC) 114 and the band-pass filter 116. The DAC 114 converts the base-band ranging signal into an analog base-band ranging signal. Inside the up converter 104 is supplied to modulator input of the up converter 104. As discussed above, the FPGA 120 can be configured to operate on a request and transmit a ranging signal back to the Master Unit when a monitoring communication is established.

As further shown in FIG. 2, the Tag 31 includes a compass sensor input 190, and a pedometer input 192. The function and purpose of these elements is the same as described above with reference to the Master units. Elements 173, 174, 175 functionally correspond to elements 33, 34, 35 of FIG. 1.

The up-converter (transmitter) section 104 transmits a base-band reply signal based on the received ranging signal. The reply signal can advantageously be configured based on the process or control logic of the Field Programmable Gate Array (FPGA) 120. The base-band ranging signal can be stored in a non-volatile memory of the FPGA 60 such as, for example, a read only memory (ROM 75). The base-band ranging signal can be generated in a digital format by the FPGA 60 logic. The base-band ranging signal is transmitted by converted it into an analog signal by the Digital-to-Analog Converter (DAC) 54 and the band-pass filter 56 for transmission as an analog ranging signal by the RF Transceiver 40. The output of the band-pass filter 56 is connected to the RF transceiver's 40 up-converter (transmitter) modulator input. In operation, the RF transceiver 40 receiver's down-converter 42 generates the base-band ranging signal in the analog form.

RF transceiver 40 and RF transceiver 100 can be configured advantageously to use the same hardware components. Similarly, the circuit components of amplifier 46, filters 48 and 56, differential amplifier 50, ADC 52 and DAC 54 can be configured to be identical components to amplifier 106, filters 108 and 116, differential amplifier 110 and ADC 114 and DAC 116, respectively. The FPGA 60 and FPGA 120 are similar in some respects but differ in the functionality and features performed for either the Master Unit 21 or Tag 31. For example, the FPGA 60 includes all of the FPGA 120 base-band ranging signal processing and generation functionality. The difference between Master Unit 21 and Tag 31 is in algorithms that are programmed in the FPGA (60 or 120) and/or the FPGA core microprocessor (CPU 80 and CPU 85) firmware to either generate a reply signal from a received ranging signal, or alternatively, in networked or communication Master Unit condition, generate a ranging and other signals in order to carry out tasks of the tracking and locating of objects in the system, as well as improving such system performance.

The algorithms that are programmed in the FPGA 60, 120 and/or the FPGA core microprocessor firmware, control the RF transceiver 40 and RF transceiver 120 as well as the rest of the Master Unit's or Tag's hardware. Accordingly, FPGA 60 and FPGA 120 contain all the base-band ranging signal generator and processor techniques as well as the system microprocessor core (CPU subsystem 80 and CPU 140). Element 118 in FIG. 2 is analogous to element 58 in FIG. 1.

Note that although there is a difference in Master and Tag device functionality, both devices can use the same hardware components, and all of the functionality of the FPGA 120 can be included in the FPGA 60, and any Master Unit 21 can also operate as a Tag 31 and vice versa. The FPGA 60/120 and its embedded microprocessor provide flexibility for implementing different functionality in the same hardware. As an example, in TOA (time of arrival) mode of operation, the Master Unit transmits a ranging signal, the Tag 31 receives the ranging signal and repeats it (sends) back to the Master 21, which will receive the returned signal and process it to determine the time-of-flight, i.e. distance to the Tag 31. In DTOA (differential time of arrival) mode of operation two Master Units 21 transmit ranging signal and the Tag 31 receives signals from these two Master Units, processes these two signals and determines the difference of arrival times. At any time the roles of the Master Unit and Tag can be reversed, to provide an operational advantage. Also, it will be appreciated that although the discussion above uses two spatial coordinates (x and y), the discussion can be readily extended to the case of three dimensions as well.

According to an embodiment of the present invention, the base-band ranging signal is a cosine waveform of 200 μs duration, from $-\pi$ to $+\pi$, which essentially limits the ranging signal bandwidth to 10 KHz or lower. However, other waveforms and ranging signal bandwidths can also be used and have been found useful in the present invention and it should not be limited to such signals.

The base-band ranging signal processor/detector operates by averaging the returned ranging signals samples values over a number of consecutive ranging signals. Thereafter, it calculates a delay time by finding the "center of gravity" time value (origin) of the averaged returned ranging signals waveform relative to the "center of gravity" time value (origin) of the reference generated ranging signal, for example, which is stored in the ROM 75 of the Master Unit 21. Alternatively, it is possible to average all the generated ranging signals and use the "center of gravity" time value of the averaged generated ranging signals waveform as the reference. Also, a matching filter technique that averages the time delay estimates results obtained over a number of consecutive ranging signals can be used and have been found useful in the present invention. Thus, the present invention should not be limited to the "center of gravity" techniques. Note that the matching filter technique, any delay estimate utilizes the signal time origin so as to maximize and match the filter's output.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A system for locating an object, comprising:
a Master Unit adapted to interface to a Tag to measure distance to the Tag;
the Master Unit having a first input, wherein the first input comprises any of a pedometer, an altimeter, an accelerometer and a solid-state gyroscope;
the Tag having a second input from which it can determine a distance the Tag has traveled, wherein the second input comprises any of a pedometer, an altimeter, an accelerometer and a solid-state gyroscope;
the Master Unit being adapted to transmitting instructions for movement to the Tag and to transmitting information related to the Master Unit's movement to the Tag, wherein the information related to the Master Unit's movement is obtained from the first input; the Master Unit being adapted to receiving information related to the Tag's movement from the Tag, wherein the information related to the Tag's movement is obtained from the second input;
the Tag being adapted to receiving the instructions for movement and to receiving the information related to the Master Unit's movement;
the Tag being adapted to transmitting the information related to the Tag's movement to the Master Unit;
the Master Unit being adapted to determine distance to the Tag by using a ranging signal;
the Master Unit being adapted to determine a position of the Tag after the Tag's movement without any additional position reference infrastructure; and
the Tag being adapted to determine the position of the Tag after the Tag's movement without any additional position reference infrastructure.

2. The system of claim 1, wherein the Tag further comprises a compass input for moving the Tag in a direction specified by the instructions, for determination of the position of the Tag.

3. The system of claim 1, wherein the Master Unit derives position related information of the Tag based on one or more distance measurements and the second input.

4. The system of claim 1, wherein the Tag further comprises a compass input from which the Tag derives a direction of movement of the Tag, and wherein the Master Unit further comprises a compass input from which the Master Unit can derive a direction of movement of the Master Unit.

5. The system of claim 1, wherein the Master Unit is adapted to transmitting requests for telemetry information to the Tag for Tag diagnostics.

6. The system of claim 1, wherein the Master Unit is configured to receive any of status, telemetry and voice information from the Tag.

7. A system for locating an object, comprising:
a Master Unit adapted to interface to a Tag to measure a distance to the Tag;
the Master Unit having a first input, wherein the first input comprises any of a pedometer, an altimeter, an accelerometer and a solid-state gyroscope;
the Master Unit having an interface to an operator of the Master Unit;
the Tag having an interface for instructing an operator of the Tag to move;
the Tag having a second input from which the Tag can determine a distance the Tag has traveled, wherein the second input comprises any of a pedometer, an altimeter, and accelerometer and a solid state gyroscope;
the Master Unit being adapted to transmitting instructions for movement to the Tag and to transmitting information related to the Master Unit's movement to the Tag, wherein the information related to the Master Unit's movement is obtained from the first input;
the Master Unit being adapted to receiving information related to the Tag's movement from the Tag, wherein information related to the Tag's movement is obtained from the second input;
the Tag being adapted to receiving the instructions for movement;
the Tag being adapted to transmitting the information related to the Tag's movement to the Master Unit;
the Master Unit being adapted to determine a distance to the Tag by using a ranging signal;
the Master Unit being adapted to determine a position of the Tag after the Tag's movement without any additional position reference infrastructure; and
the Tag being adapted to determine the position of the Tag after the Tag's movement without any additional position reference infrastructure.

8. The system of claim 7, wherein the Master Unit is adapted to determine the position of the Tag after the Tag's movement in any direction, based on one or more previous distance measurements.

9. The system of claim 7, wherein the Master Unit is adapted to determine the position of the Tag during a combined movement of the Master Unit and the Tag.

10. The system of claim 7, wherein the Tag's movement is based on the instructions for movement.

11. The system of claim 7, wherein the Tag's movement is independent of the Master Unit.

12. The system of claim 7, wherein the Master Unit functions as the Tag and the Tag functions as the Master Unit.

13. A method for locating an object, comprising the steps of:
interfacing a Master Unit to a Tag;
determining a first distance to the Tag from the Master Unit using a ranging signal;
at the Master Unit, receiving a first input, wherein the first input comprises any of a pedometer, an altimeter, an accelerometer, a compass and a solid-state gyroscope;
at the Tag, receiving a second input and deriving a second distance and direction the Tag has traveled based on the second input, wherein the second input comprises any of a pedometer, and altimeter, an accelerometer, a compass and a solid-state gyroscope;
transmitting instructions to the Tag for movement of the Tag;
at the Master Unit, receiving information from the Tag relating to the Tag's movement;
the Master Unit being adapted to determine one or more additional distance measurements to the Tag from the Master Unit after the Tag's movement without any additional position reference infrastructure; and
the Master Unit being adapted to determine one or more positions of the Tag after the Tag's movement without any additional position reference infrastructure.

14. The method of claim 13, wherein the Master Unit derives its current position based on the first input.

15. The method of claim 13, further comprising transmitting requests for telemetry information from the Master Unit to the Tag for Tag diagnostics.

16. The method of claim 13, further comprising transmitting voice information to the Tag for instructing the Tag to move in a predetermined direction pattern.

17. The system of claim 2, wherein the Master Unit can derive position related information of the Tag based on one or more distance measurements, the second input and the compass input.

18. The system of claim 1, wherein the Master Unit functions as the Tag, and the Tag functions as the Master Unit.

19. The method of claim 13, wherein the instructions for movement of the Tag include instructions for movement of the Tag in a predetermined direction and distance pattern.

20. The method of claim 13, wherein the instructions for movement of the Tag include instructions for movement of the Tag in a predetermined direction pattern.

* * * * *